UNITED STATES PATENT OFFICE.

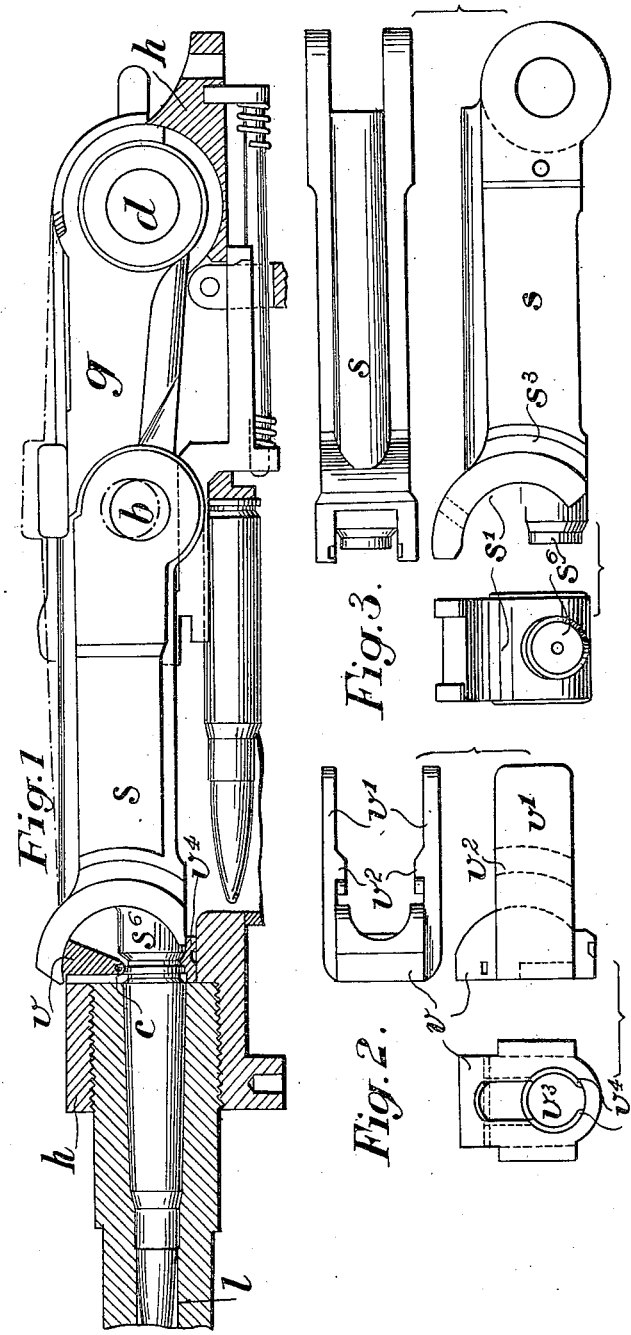

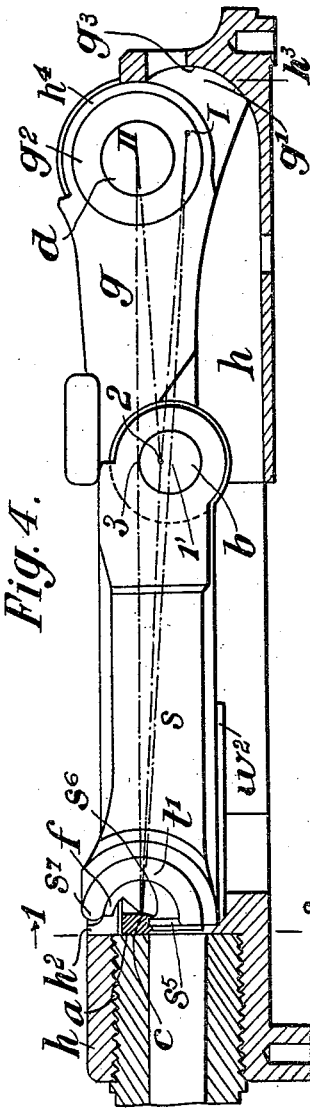

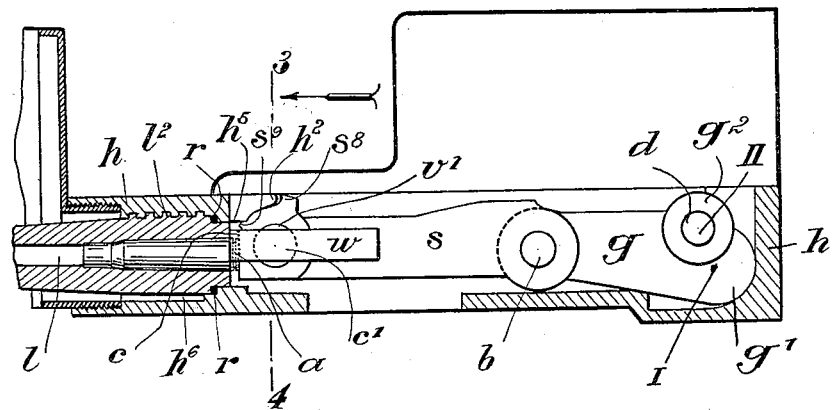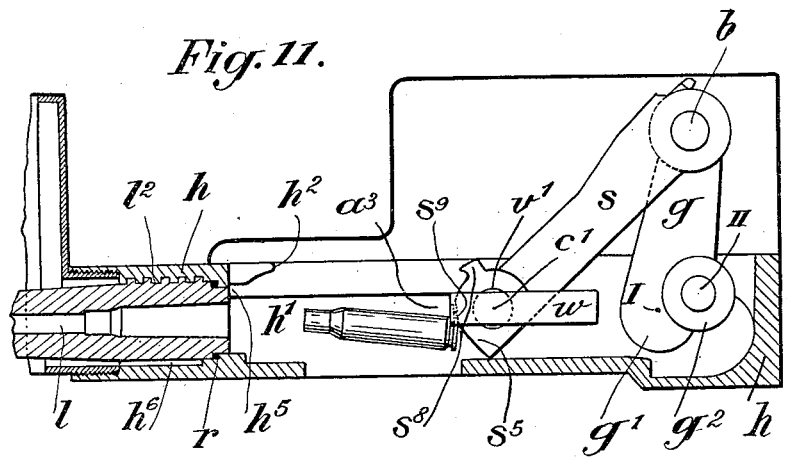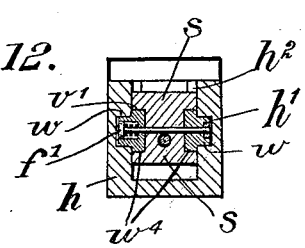

ANDREAS WILHELM SCHWARZLOSE, OF CHARLOTTENBURG, GERMANY.

BREECH MECHANISM.

1,077,166. Specification of Letters Patent. Patented Oct. 28, 1913.

Application filed March 8, 1913. Serial No. 753,045.

*To all whom it may concern:*

Be it known that I, ANDREAS WILHELM SCHWARZLOSE, a subject of the German Emperor, and resident of Charlottenburg, Germany, have invented certain new and useful Improvements in Breech Mechanism, of which the following is a specification.

The object of the invention is to provide a breech mechanism of this kind in which the front member of the knuckle is extended up to the rear end of the barrel so that at the moment of firing the back thrust of the cartridge head is not received as heretofore by the breech block but directly by the front member of the knuckle joint and is transmitted to the rear member. In the place of three points of articulation as heretofore, only two have in this arrangement to bear the strain of the gas pressure and thus the sagging of the breech mechanism after a prolonged use is considerably lessened. The front surface of the front member of the knuckle applying itself against the head of the cartridge is arranged in such a manner with reference to its center of rotation in the head of the breech mechanism that at the moment of firing the gas pressure causes the breech knuckle to swing to its open position, and thus automatically open the breech mechanism even when the bending point of the knuckle joint is positioned, before the firing, considerably below the dead center. The cartridge case, after having moved backward a very short distance, is received and held by abutments of the head of the breech mechanism in order to prevent the head of the cartridge case from being torn off.

The accompanying drawings show several forms of embodiments of this invention and in these drawings: Figure 1 shows a longitudinal section, partly in side elevation, of the knuckle breech mechanism of a gun in its closed position. Fig. 2 shows several views of the head of the mechanism. Fig. 3 also shows several views of the front member of the knuckle joint. Figs. 4 and 5 show longitudinal sectional views, with the parts of the breech mechanism in side elevation, of a modified form of the knuckle joint breech mechanism of a gun in the closed and open positions respectively. Fig. 6 is a cross section of same on line 1—2 of Fig. 4. Figs. 7 and 7ª show respectively side and front elevation of one of the guide plates. Figs. 8 and 8ª show similar views of the extractor. Figs. 9 and 9ª show two detail views of the hinge pin of the knuckle. Figs. 10 and 11 show longitudinal sectional views with the parts of the breech mechanism in side elevation, of a third form of the breech mechanism applied to machine guns, in the closed and open position respectively. Fig. 12 is a cross sectional view of the mechanism on line 3—4 of Fig. 10.

The barrel 1 is rigidly secured by means of screw threads with the breech casing $h$ and both parts are rigidly connected in the well known manner with the stock of the gun. The breech mechanism comprises the block $v$ and the knuckle joint members $s$ and $g$ which are connected in the usual way with each other at the bending point by means of the bolt $b$ while at the rear end they oscillate in the breech casing around the bolt $d$. The guide head is composed of a substantially semi-cylindrical part $v$ the front end of which is cut off straight and is provided at this place with the depression for the cartridge head, as well as with the two lateral members or wings $v^1$ which are guided in a straight line in longitudinal grooves of the breech casing. The wings are provided on their inside with arc shaped ribs $v^2$ which when the breech mechanism is put together engage the two similarly shaped milled out portions $s^3$ of the front member $s$ of the knuckle and thus couple the knuckle in a rotary manner with the breech head or block. The front part of the knuckle is provided to this end with an arcuate milled out portion $s^1$ by means of which it is permitted to rotate over the semi-cylindrical surface of the head $v$. The axis of rotation $c$ (Fig. 1) between the knuckle and the breech head or block is here positioned at the height of the head of the cartridge in the barrel. The breech head or block is provided with a passage $v^3$ centrally arranged with reference to the axis of the barrel and through which the cylindrical projection $s^6$ of the front member of the knuckle passes. When the breech mechanism is closed (Fig. 1) the front end of the projection fits against the head of the cartridge in the barrel. The projection thus receives, when the shot is fired, the back pressure of the head of the cartridge and transmits it directly *i. e.* without passing through a breech block or head, to the breech knuckle joint. Now, as the center of rotation $c$ of the articulation is situated above the projection $s^6$ i. e. eccentrically with reference to its front end applied against the cartridge head; the knuckle, when the shot is fired, is swung a short distance upward around the fulcrum $c$ by the gas pressure (dot and dash lines Fig. 1) and the breech mechanism is afterward automatically opened by the momentum thus received by it. The diameter of the front end of the front member of the knuckle joint is smaller than that of the cartridge head. The latter, when the shot is fired and after the cartridge case has slid backward a short distance, is received by the abutments $v^4$ of the breech head or block which when the breech mechanism is closed stand a short distance behind the front end of the knuckle joint.

In the second form of embodiment shown by Figs. 4 to 9, in order to cause, when the knuckle joint is automatically swung open by the back pressure of the cartridge, the knuckle joint to support the cartridge case longer than in the first form of embodiment the stroke performed by the hinge of the knuckle joint being the same, two or more superposed fulcrums have been provided on the rear member of the knuckle joint, which fulcrums are adapted to apply themselves one after the other against the breech casing during the opening of the mechanism. The cylindrically shaped bearing surfaces are arranged, according to this invention, not one above the other but side by side in such a manner that the knuckle of the breech mechanism bears continuously against a comparatively large surface of the breech casing. Consequently the bearing surfaces cannot, when continuous firing is carried on, be forced back as would be the case if only one continuous curve shaped bearing surface has been provided on the knuckle and on the breech casing, because in the latter case only a small part of the whole bearing surfaces would be in close contact during the opening of the mechanism.

In the new breech mechanism the knuckle joint, naturally must be mounted with a little more clearance than heretofore on the rear hinge bolt $d$ so that the rear member of the knuckle joint can, with its upper fulcrum, swing slightly forward during the closing of the mechanism as soon as the lower fulcrum bears against the breech casing. In order to avoid, when the breech mechanism is automatically opened, the case of the cartridge fired being loosened late, the front member of the knuckle joint strikes, during the first part of the swinging up motion, with a shoulder against a fixed abutment of the breech casing, the said shoulder being positioned above the front fulcrum of said front part. The member of the knuckle thus acts like a knee lever against the member carrying the extractor and loosens any cartridge case which might be wedged in the cartridge chamber of the barrel.

The sagging of the breech mechanism which takes place after a prolonged use is prevented according to the present invention by the hinge bolt being eccentrically constructed at its center. This rotation of the bolts allows of its higher positioned side being brought forward and of the knuckle joint being lengthened in a corresponding manner. Instead of the breech head or block, with its solid front part and its two guide wings, two separate guide plates are used to insure the longitudinal guiding of the knuckle joint, these plates being held on the knuckle joint by the extractor when the breech mechanism is removed from the breech casing. The front member of the knuckle can in this embodiment be continued up to the barrel without being reduced in thickness whereby the breech mechanism becomes considerably more stable than in the construction first described. The breech casing $h$ is in this form, too, rigidly secured by means of screw threads to the barrel; the members $s$ and $g$ of the knuckle are connected at the bending point by means of the bolt $b$ and with the breech casing by means of the wing shaft $d$. In this instance the member $g$ is provided however at its rear end with an additional central bearing $g^1$. The rear part of the latter forms a cylindrical surface $g^3$ the axis of which is at I. When the breech mechanism is closed this surface bears against the milled out portion $h^3$ having the same radius of curvature as the breech casing $h$ (Figs. 4 and 5) while the two lateral trunnions $g^2$ of the member, the axis of which trunnions is at II, are at the same moment at a distance of about 0.3 mm. from their rear bearing surfaces $h^4$ in the breech casing. Now, at the moment of firing the member $s$ of the joint, the front axis of rotation being at $c$, is thrown upward by the back pressure of the cartridge head in the manner described for the first form of embodiment, the rear member $g$ first rotates around the axis I until the bending point $1^1$ of the knuckle joint has been swung into the position 2. During this movement the two bearings $g^1$ and $g^2$ of the rear member have moved backward to such an extent that their rear bearing surfaces $h^4$ are in close contact with the corresponding surfaces of the breech casing. During the continuation of the movement of the bending point of the knuckle until the mechanism is entirely open (Figs. 5) the rear member rotates around the axis II, its bearing $g^1$ swinging then forward out of its bearing $h^3$. Now, when the breech mechanism is closed, the flexing point $1^1$ is about in the dead center with reference to the axis I. Therefore all parts of the front surface $s^5$ of the front member recede slightly during the opening motion until the point 2 is reached. When the point 2 is passed, the rear member of the knuckle, during the continuation of its swinging motion pushes the upper side of the front surface $s^5$ forward and thus limits the distance it would move backward owing to the angular motion because the dead center of the axis II is only at 3. It is only when this point has been passed, that the front surface $s^5$ withdraws its top from the head of the cartridge. But then the projectile has already left the barrel.

In Fig. 4 the action of the two axes I and II with the bending point of the knuckle up to the second dead center 3 has been shown by means of dot and dash lines. The front surface $s^5$ of the front member $s$ is slightly inclined at $s^6$ in order to prevent this surface sticking fast to the cartridge head through wedging when the bending point of the knuckle joint swings from 2 to 3. When the breech is closed the line of pressure from $c$ to I passes slightly below the bending point $1^1$ and, as the cartridge is fired, the entire knuckle joint moves backward till $g^1$ contacts with $h^3$ whereupon the point $1^1$ moves upward to the position 2. At this time $g^1$ and $h^5$ begin to separate and the rear member $g$ to revolve about II as a center. The line of pressure now extends from $c$ to II and lies above $1^1$ but the inertia of movement of the joint upward carries the point $1^1$ through this new line of pressure and the breech opens, the two members straightening during the first part of the movement and thus holding the cartridge in place momentarily. Shortly before the knuckle joint has passed, during the opening motion, the second dead center, the shoulder $s^7$ of the front member of the knuckle joint engages the abutment $h^2$ (Figs. 4 and 5) of the breech casing. The knuckle joint, when continuing its swinging motion, then rotates at the front momentarily around the shoulder $s^7$ acting like a knee lever against the guide plate $w$ and the extractor $a$ hooked therein, so that the cartridge case is energetically loosened in the barrel. The two guide plates $w$ sliding in the longitudinal grooves $h^1$ of the breech casing are provided on their inner sides with arcuate grooves $w^1$ (Fig. 7) with which, when the breech mechanism is put together, the front member of the knuckle joint engages by means of the two similarly shaped lateral ribs $t^1$ whereby it is connected in a rotatable manner with the plates. The latter carry below projecting ribs $w^2$ which when the mechanism is closed, extend slightly beyond the front member (Figs. 4, 6) and serve to keep the uppermost cartridge of the magazine away from the knuckle joint. Each plate is provided at the front with a bearing $w^3$ (Fig. 7) which serves to secure the extractor $a$. The latter, before the parts are inserted into the breech casing, is first slid with its two lateral ears $a^1$ (Figs. 5, 8) from the front on the guide plates which are already connected with the member $s$ of the knuckle. Thereafter its holding studs $a^2$ are tilted down into the corresponding bearings of the plates and are thus connected with the latter (Fig. 5). The extractor spring $f$ (Figs. 4, 6) which is then secured in an elongated hole of the front member of the knuckle joint, always forces the extractor yieldingly downward and at the same time prevents it from sliding from the guide plates. The latter then are still adapted to rotate on the knuckle but they are prevented from falling off. Owing to the breech head or block being replaced by the two guide plates, it is possible to place the front member of the knuckle joint also much lower than heretofore so that the devices for firing are now positioned in axial alinement to the axis of the bore of the barrel and the firing pin need no longer be made eccentric as this was necessary in the construction described first.

Fig. 9 shows a hinge bolt the central part $b$ of which is eccentrically arranged with reference to the lateral part $b^1$. By rotating this bolt 180° the flexing point of the knuckle joint can be lowered to such an extent that at the moment of firing the breech mechanism is no longer opened automatically. In machine guns the eccentric bolt can be used to take up the clearance which after prolonged shooting is formed between the breech mechanism and the cartridge head owing to the sagging of the knuckle joint.

The Figs. 10 and 11 show a third form of embodiment of the new breech mechanism with knuckle joint applied to a machine gun. This form of embodiment is distinguished in that at the moment of firing the breech mechanism under the back pressure of the cartridge head, first recedes a little as in the forms of embodiment already described in order to impart to the knuckle the momentum necessary for the automatic opening but then supports the fired cartridge case immovably with reference to the breech casing until the projectile has left the barrel. In order to attain the result cited above the front member of the knuckle joint swings here during the opening at the front end successively around two axes of rotation one of which as in the forms of embodiment described in the first instance, lies at the height of the head of the cartridge case while the second one is positioned behind the cartridge head. Besides, in this construction the ejection of the cartridge cases is also effected by the front member of the knuckle so that the ejector is dispensed with. Besides, the guide plates for the front member of the knuckle will serve at the same time as extractors, one of them being provided to this effect at its front end with an inwardly projecting claw which engages the groove of the cartridge engaged in the barrel and thus, when the breech mechanism is opened also pulls this cartridge casing backward.

In order to prevent, in machine guns provided with a cooling jacket, the heating of the breech casing as well as the lengthening thus produced in the latter and which has a disturbing influence upon the breech mechanism, the rear tightening ring $m$ is arranged in such a manned between the barrel and the jacket that the cooling liquid is allowed to circulate up to the rear opening of the barrel. In the mechanism shown by Figs. 10 and 11, the breech casing $h$ and the rear member $g$ of the knuckle are constructed like these parts in the second form of embodiment described above. However, the hinged connection between the member and the guide plates $w$ is effected here by means of cylindrical pivots $w^4$ which engage corresponding bored out holes on both sides of the member $s$. The vertical distance of the front axis of rotation $c^1$ thus formed from the axis of the barrel is smaller than the diameter of the cartridge head. Besides the front surface $s^5$ is curved at $s^8$ in such a manner that, when the opening takes place automatically the mechanism coöperating with the axes I and II of the rear member of the knuckle shores up the fired cartridge case in the barrel as long as the gas pressure lasts. In this construction in order to cause the back pressure of the cartridge head to impart to the knuckle joint the momentum necessary for effecting the automatic opening, studs $s^9$ have been provided on the front member $s$. These studs, during the latter part of the closing movement place themselves under abutments $h^5$ of the breech casing and pull the guide plate $w$ slightly downward so that a slight clearance is produced at the top between the plates and the breech casing. Thus it is that at the moment of firing the knuckle joint acted upon by the back pressure of the cartridge head swings upward first around the fulcrum $c$ (Fig. 10) in the manner described for the first form of embodiment and then after a short movement continues its rotatory movement round the fulcrum $c^1$. The front member of the knuckle when swinging upward strikes here with the stud $s^9$ against the head of the extracted cartridge case and flings the latter downward or sidewise (Fig. 11). The extraction of the fired cartridge case is produced by inwardly projecting claws $a^3$ of the guide plates $w$, which when the breech mechanism is closed, suddenly snap, like the well known extractors, in front of the base of the cartridge engaged in the barrel; the guide grooves $h^1$ being to this end enlarged a little at their front part. The spring $f$ connects both plates and pulls them constantly toward the breech knuckle.

The barrel 1 is connected with the breech casing in the well known manner by means of the interrupted screw $l^2$ forming a kind of bayonet joint. The tightening washer $r$ which maintains watertightness between both parts and the breech mechanism, is positioned a short distance in front of the breech mechanism so that the cooling liquid is allowed to arrive at the rear opening of the barrel through the longitudinal slots $h^6$ which allow of the introduction of the threads $l^2$.

Having now fully described my said invention, what I claim and desire to secure by Letters Patent, is:

1. In a breech mechanism the combination with the barrel and the breech casing; of a knuckle joint comprising front and rear members which are in alinement when the breech is closed, the front member extending up to the rear end of the barrel whereby at the moment of firing said front member directly receives the back pressure of the head of the cartridge in said barrel, and transmits said pressure directly to said rear member of the knuckle whereby the knuckle joint is broken and the members disalined; substantially as and for the purpose set forth.

2. In a breech mechanism the combination with the barrel and the breech casing, of a knuckle joint comprising a front member and a rear member, means for connecting the rear end of said rear member with the said breech casing in such a manner as to provide a plurality of superposed axes of rotation adapted, when the mechanism is automatically open, to successively act as pivot points for said rear member, the member and casing having a plurality of juxtaposed bearing surfaces concentric with said axes, substantially as described.

3. In a breech mechanism the combination with the barrel and the breech casing, of a knuckle joint comprising a front member and a rear member, a shoulder provided on the said front member above its axis of rotation, an abutment provided on the said breech casing and adapted when the said front member swings open, to be engaged by the said shoulder and means on said shoulder arranged to engage and loosen a fired cartridge case during opening movement.

4. In a breech mechanism the combination with the barrel and the breech casing, of a knuckle joint comprising a front member and a rear member, two separate guide plates slidably mounted in said casing and pivotally connected to the front end of said front member and an extractor carried by the said guide plates and the said front member, substantially as and for the purpose set forth.

5. In a breech mechanism the combination with the barrel and the breech casing, of a knuckle joint comprising a front member and a rear member, guide plates pivotally connected to the front end of said front member and slidably mounted in the said breech casing, inwardly projecting claws provided on the said guide plates and adapted to engage the groove of the cartridge engaged in said barrel and to thus act as an extractor for same, substantially as set forth.

In testimony whereof I have hereunto set my hand in presence of two witnesses.

ANDREAS WILHELM SCHWARZLOSE.

Witnesses:
 HENRY HASPER,
 WOLDEMAR HAUPT.

Copies of this patent may be obtained for five cents each, by addressing the "Commissioner of Patents, Washington, D. C."